US005096022A

United States Patent [19]

Bowers

[11] Patent Number: 5,096,022

[45] Date of Patent: Mar. 17, 1992

[54] THEFT-PROOF FLAG LOCKING SYSTEM

[75] Inventor: Charles E. Bowers, 3320 Landview, Rochester, Mich. 48064

[73] Assignee: Charles E. Bowers, Rochester, Mich.

[21] Appl. No.: 459,530

[22] Filed: Jan. 2, 1990

Related U.S. Application Data

[63] Continuation-in-part of Ser. No. 230,194, Nov. 17, 1988, abandoned.

[51] Int. Cl.$^5$ .................... B65H 59/16; F16D 69/00; G09F 17/00

[52] U.S. Cl. ............................ 188/65.1; 24/136 R; 116/173; 188/265

[58] Field of Search .............. 188/65.1, 265; 254/391, 254/387; 116/173, 174; 24/136 R, 115 M

[56] References Cited

U.S. PATENT DOCUMENTS

| | | | |
|---|---|---|---|
| 2,386,908 | 10/1945 | Puckett | 24/136 R |
| 3,976,283 | 8/1976 | Schmit | 116/173 X |
| 4,103,642 | 8/1978 | Swenson | 116/174 |

FOREIGN PATENT DOCUMENTS

| | | | |
|---|---|---|---|
| 2457945 | 6/1976 | Fed. Rep. of Germany | 116/174 |
| 0201319 | 8/1923 | United Kingdom | 24/136 R |

*Primary Examiner*—Robert J. Oberleitner

[57] ABSTRACT

A flag-locking mechanism for an external halyard flagpole having a pulley affixed near the top thereof and a halyard which runs over the pulley, the flag being carried on the outside run of the halyard, the locking mechanism including a housing constructed to be affixed to the flagpole near the top thereof beneath the pulley through which is threaded the inside run of the halyard, a locking pin moveable in the housing and toward an inside face of a wall thereof whenever the inside run of the halyard is moved upwardly, such frictional movement of the locking pin being capable of squeezing such inside run of the halyard between itself and the housing wall to arrest further movement of the halyard, an attachment to the locking pin for exerting a downward pull thereon to move same from its lock position into its unlock position including a cable disposed in the interior of the flagpole and extending downwardly therein to a level near the ground where it can be accessible, the lower end of the cable being fastened to a moveable lockpart lockable in a second lockpart held fast in the wall thickness of the flagpole, whereby, such authorized user with a key can unlock the moveable lockpart and pull upon the lower end of the cable to exert a downward pull upon the locking pin to move same from its lock position into its unlock position, whereby to free the halyard for lowering or raising of the flag.

5 Claims, 3 Drawing Sheets

THEFT-PROOF FLAG LOCKING SYSTEM

This application is a continuation in part of copending application Ser. No. 230,194 filed Nov. 17, 1988, now abandoned.

My invention relates to flag flying on external halyard flagpoles.

The principal object of my invention is the provision for the benefit of patriotic flag flyers of a flag-locking system for such flagpoles which prevents theft of the flag or of the halyard.

Figure 2:
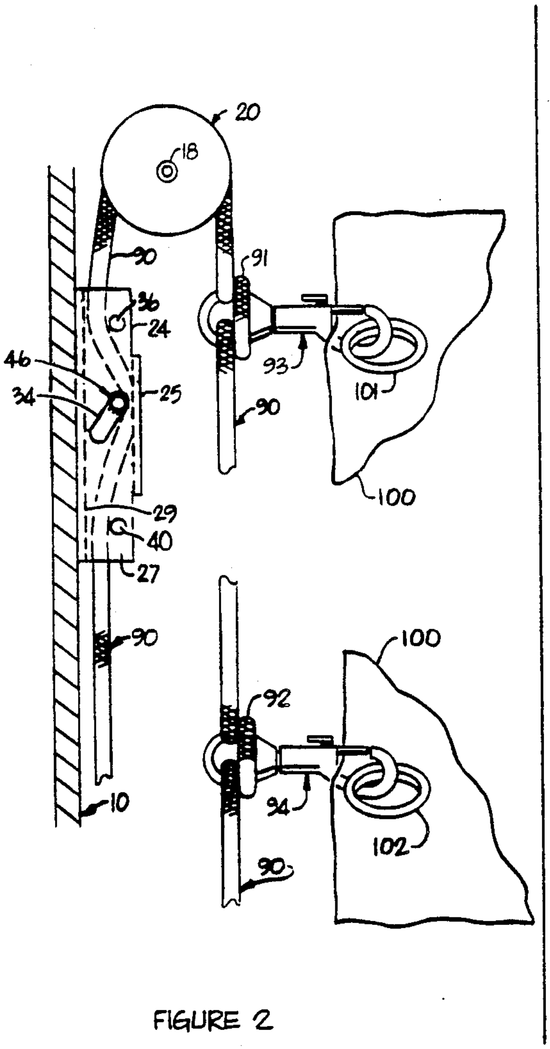
Figure 1:
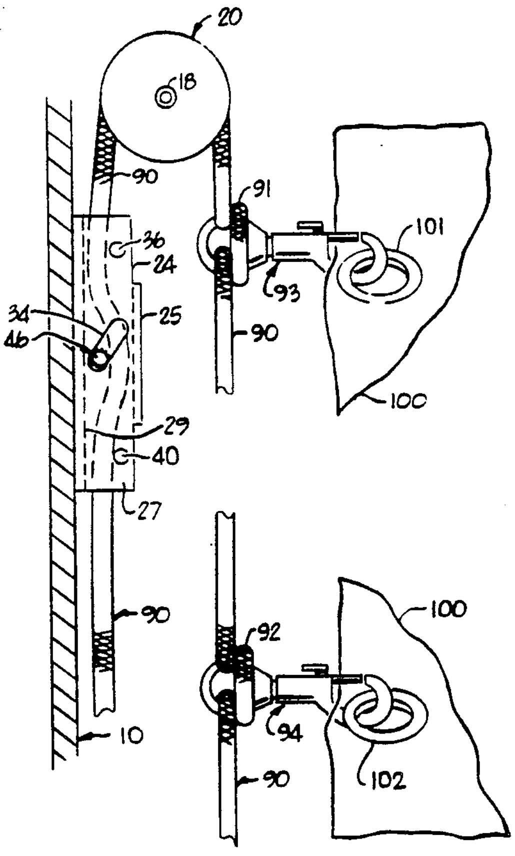
Figure 3:
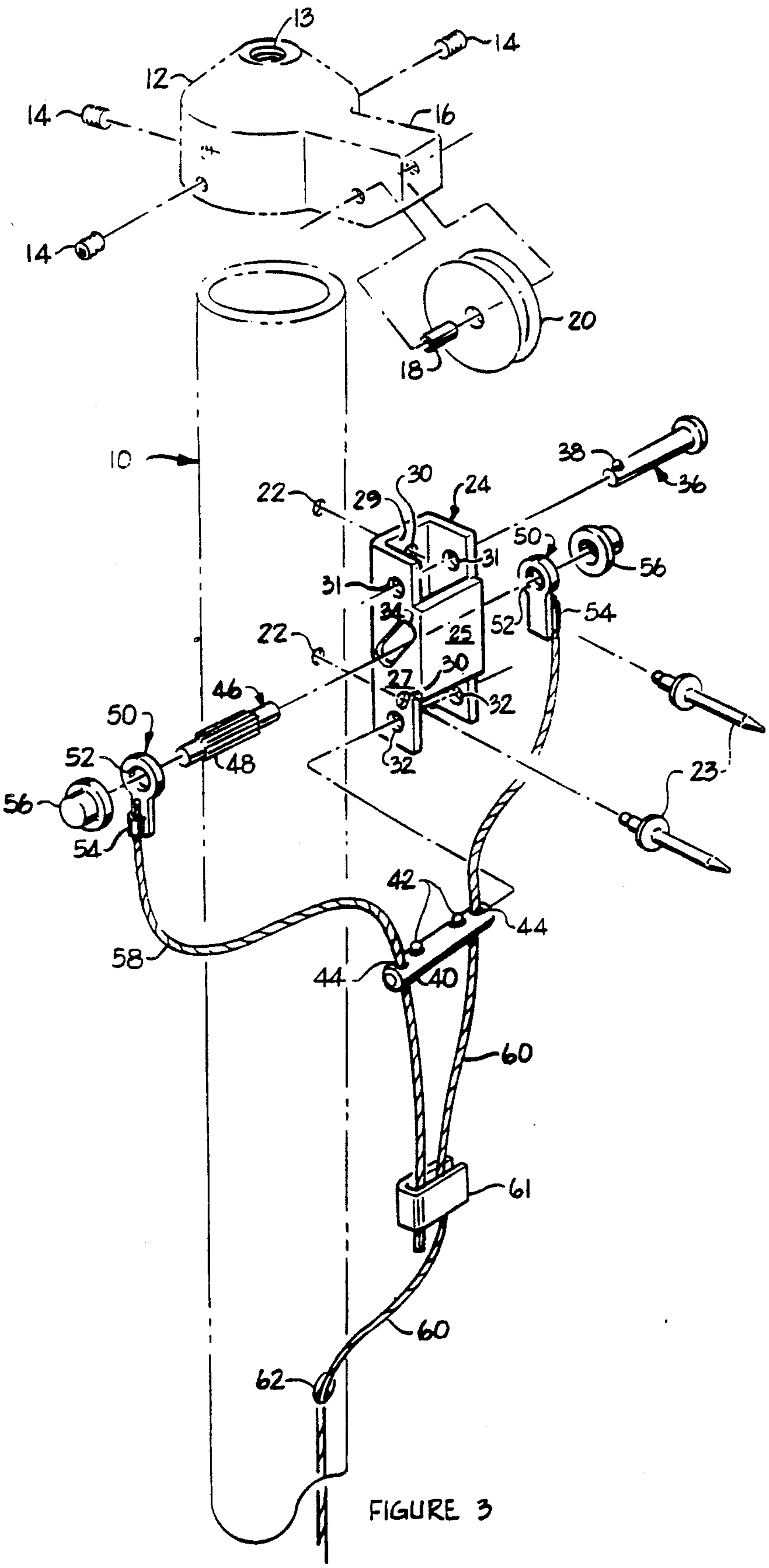
Figure 4:
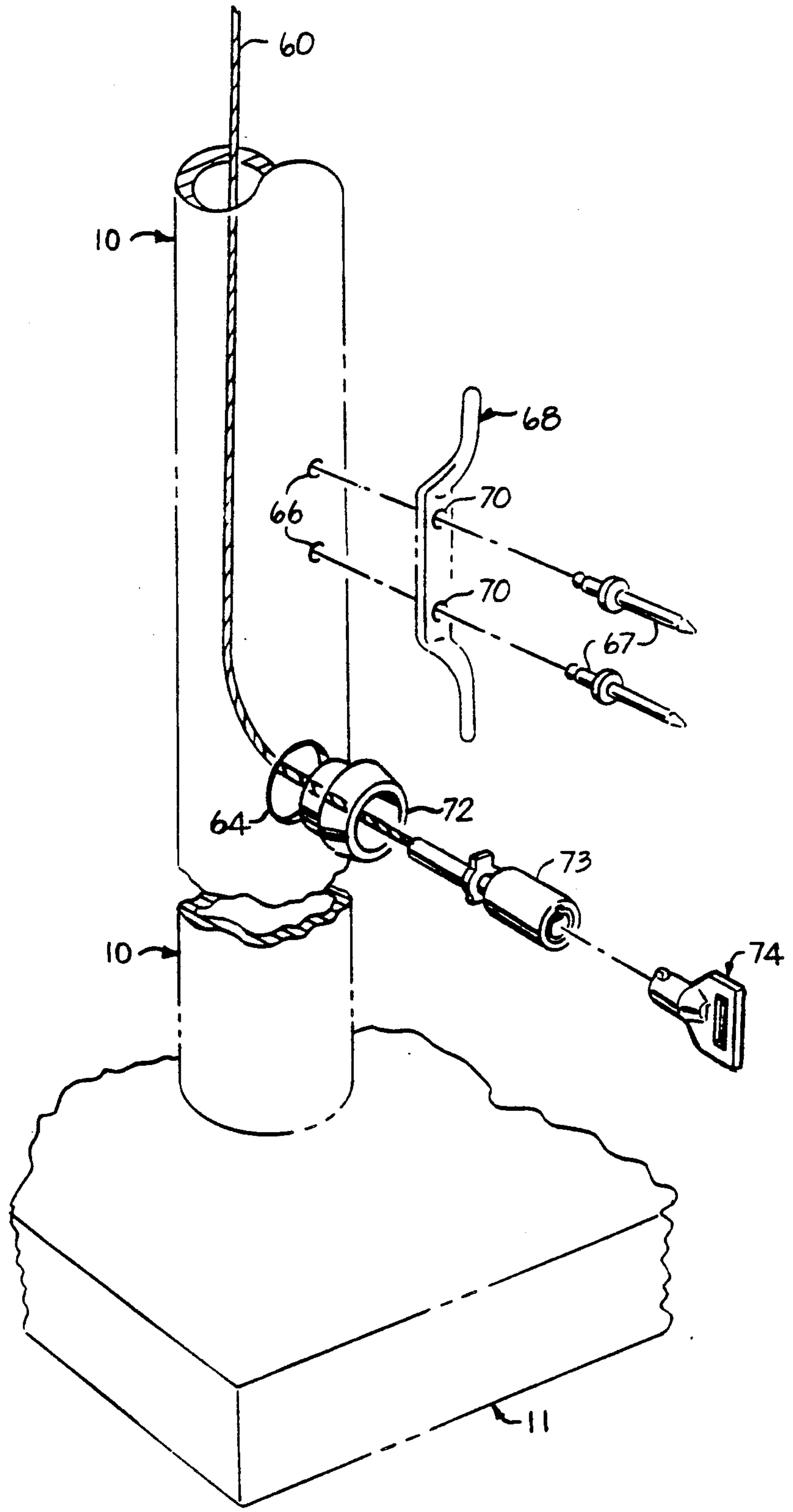

The foregoing object of my invention and the advantages thereof will become apparent during the course of the following description, taken in conjunction with the accompanying drawings, in which:

FIGS. 1 and 2 are respective side elevational schematic views of a flag-locking system embodying my invention; and FIGS. 3 and 4 are respective exploded perspective views of said flag-locking system.

Referring to the drawings in greater detail, reference numeral 10 designates an external halyard flagpole upstanding from a base 11 and having an end cap 12 covering the top end thereof. The end cap 12 has a central threaded aperture 13 therein for holding a suitable emblem (not shown), as is usual, and a pair of horizontally aligned apertures in the cylindrical wall thereof for threadably engaging a pair of set screws 14 which fasten the end cap 12 on the top of the flagpole 10. The end cap 12 has a nosepiece 16 which receives a pulley 20 therein about which the upper end of an external halyard 90 travels in the process of raising or lowering a flag 100 carried on said halyard 90. An axle 18 on which the pulley 20 rotates is fastened in opposite walls of he nosepiece 16. The upper end of the flagpole 10, beneath the end cap 12, is drilled with a pair of apertures 22 for receiving a pair of pop-rivets 23 used to fasten to the flagpole 10, a housing 24 which is a part of said flag-locking system.

The housing 24 is fastened on the flagpole 10 at great heights about the ground (30 or more feet) so as to be inaccessible to would-be thieves. The housing 24 is provided with a front wall 25 (of shortened height, as shown), a pair of side walls 27 and a rear wall 29. A pair of vertically aligned apertures 30 is provided in the rear wall 29 for passing a pair of pop-rivets 23 when the housing 24 is being made fast to the flagpole 10. An upper pair of horizontally aligned apertures 31 is provided in the side walls 27 for receiving a stationary headed pin 36 having a depressable ball-type detent 38 in the free end thereof. When in place in the apertures 31, the head of the pin 36 and the ball 38 are disposed outside of the outside faces of the side walls 27. A lower pair of horizontally aligned apertures 32 is provided in the side walls 27 for receiving a headless pin 40 having a pair of ball-type detents 42 therein. The detents 42 are disposed inside of the inside faces of the side walls 27 when the pin 40 is in place in the apertures 32. The outer free ends of the pin 40 are provided with a pair of apertures 44 through which slidably pass wires 58 and 60, respectively, for purposes which will appear. The side walls of the housing 24 are provided with a pair of horizontally aligned slots 34 which extend upwardly and outwardly from the rear wall 29. A locking pin 46 having a splined center section 48 is insertable into the pair of slots 34. When disposed therein, the free ends thereof project beyond the outside faces of the side walls 27 and slidably receive thereon a pair of wire-holding eyelets 50. A pair of end caps 56 hold the locking pin 46 in place on the housing 24 and retain the eyelets 50 on the locking pin 46. Crimpable wire-holding tubes 52 are provided on the eyelets 50 for holding the upper ends of the wires 58 and 60. The wire 58 terminates a short distance beneath the housing 24, as shown, where its lower end is joined to the wire 60 via a crimpable fastener 61, as shown.

For the main extent of its length, the wire 60 is disposed inside of the flagpole 10. It enters therein through an angles aperture 62, just below the housing 24. The aperture 62 is angled by drilling same from above at an angle so that as it goes through the wall thickness of the flagpole 10 it extends both downwardly and inwardly. In this way, it better accomodates the movement of the wire 60 which wants to move up and down at this point, After entering the interior of the flagpole 10, the wire 60 extends downwardly therein to about 5 feet or so above the ground where it exits from the flagpole 10 through an aperture 64 therein. A hollow lockpart 72 is made fast in the aperture 64, as by a press fit, which, in turn, slidably receives a removeable lockpart 73 which is lockable inside of the lockpart 72. The lower end of the wire 60 is made fast to the rear end of the moveable lockpart 73, such that when said lockpart 73 is locked in place inside of the lockpart 72, the wire 60 is unaccessible. When a key 74 is inserted into the lockpart 73 and turned to unlock same, such lockpart 73 is removeable outwardly of the stationary lockpart 72 so the lower end of the wire 60 can be pulled upon to release the locking pin 46 from its lock position.

A cleat 68 having vertically aligned apertures 70 therein is made fast to the flagpole 10 above the aperture 64 by a pair of pop-rivets 67. Any excess of the halyard 90 near the ground is wound, as is usual, about the cleat 68. The pulley 20 divides the halyard 90 into an inside run thereof closest to the flagpole 10 and an outside run thereof furthest from the flagpole 10. Such inside run extends downwardly from the pulley 20 through the housing 24 (by being threaded under the upper stationary pin 36, over the moveable locking pin 46 and under the lower stationary pin 40) to near the ground where it joins the lower end of the outside run of the halyard 90. The outside run extends upwardly to where it is joined at two places to the flag 100 and reaches the pulley 20. Such outside run of the halyard 90, below the pulley 20, is knotted at 91 to fasten to an eyelet-type fastener 93 which connects to a grommet 101 in the upper inside corner of the flag 100 and is also knotted at 92 to fasten to another eyelet type fastener 94 which connects to a grommet 102 at the lower inside corner of the flag 100. I have made the housing 24 of aluminum and likewise the locking pin 46. I have made the pins 36 and 44 of steel. I have made the wires 58 and 60 of non-corosive steel cable.

In operation of said flag-locking system when the flag 100 is flying, if a would-be thief were to pull down upon the outside run of the halyard 90 to lower the flag 100, he would find that the flag 100 will not lower because the inside run of the halyard 90 will be arrested in its upward movement by being squeezed between the locking pin 46 and the inside face of the front wall 25. Were the thief to pull down upon the inside run of the halyard, it would be soon arrested in its movement by the upward movement of the outside run of the halyard until the knot 91 reaches the pulley 20, whereupon no further movement of the halyard 90 can occur. An authorized user, on the other hand, who has possession of the key 74 can unlock the moveable lockpart 73 from the stationary lockpart 72 and pull such moveable lockpart 73 outwardly of the aperture 64 so that the wire 60 travels with it and can be pulled upon the apply a downward force upon the locking pin 46 to move it from its lock position (FIG. 2) into its unlock position (FIG. 1). Such downward pull upon the locking pin 46 must be maintained in order to achieve free movement of the halyard 90 so as to raise or lower the flag 100. One person can exert a downward pull upon the lower end of the wire 60 while another person pulls upon the outside run of the halyard 90 to lower the flag 100 or upon he inside run to raise the flag 100. A downward pull upon the lower end of the wire 60 can be exerted by a suitable tool, such as a pair of snap-on pliers, so as to enable a single person to pull upon the outside or inside run of the halyard 90 to lower or raise the flag 100.

It will thus be seen that there has been provided by my invention, a flag-locking system for locking the flag of an external halyard flagpole in which the object hereinabove set forth, together with many thoroughly practical advantages, has been successfully achieved. While a preferred embodiment of my invention has been shown and described, it is to be understood that variations and changes may be resorted to without departing from the spirit of my invention.

What I claim is:

1. A flag-locking mechanism for locking a flag flying on an external halyard flagpole having a pulley affixed near the top thereof and a halyard which runs over the pulley, the flag being carried on an outside run of the halyard, said locking mechanism including a housing constructed to be affixed to the flagpole near the top thereof beneath said pulley and through which is threaded an inside run of said halyard, a locking pin moveable in said housing and toward an inside face of a wall thereof whenever the inside run of the halyard is moved upwardly, such movement of said locking pin being capable of squeezing such inside run of the halyard between itself and said housing wall to arrest further movement of said halyard, means affixed to said locking pin for exerting a downward pull thereon to move same from its lock position into its unlock position including a cable disposed in the interior of said flagpole and extending downwardly therein to a level near the ground where it can be accessible to an authorized user of said flagpole, the lower end of said cable being fastened to a moveable lockpart lockable in a second lockpart held fast in the wall thickness of said flagpole, whereby, such authorized user with a key can unlock the moveable lockpart and pull upon the lower end of said cable to exert a downward pull upon said locking pin to move same from its lock position into its unlock position, whereby to free the halyard for lowering or raising of the flag.

2. A flag-locking mechanism as claimed in claim 1 further comprising a pair of horizontally aligned slots in opposite side walls of said housing, said slots extending upwardly and outwardly from said flag-pole toward said inside face of said housing wall, said locking pin being disposed in said pair of slots and moveable therein between its lock and unlock positions relative to the inside run of said halyard.

3. A flag-locking mechanism as claimed in claim 2 in which said locking pin has its opposite ends thereof projecting outside of the outside faces of the side walls of said housing, and said means affixed to said locking pin is affixed to both said ends so that a balanced downward pull is exerted upon said locking pin whenever a downward pull is exerted upon the lower end of said cable.

4. A flag-locking mechanism as claimed in claim 3 in which said housing has fast thereon a stationary pin above such moveable locking pin and a second stationary pin below, the inside run of said halyard being threaded through said housing beneath each stationary pin and above said moveable locking pin.

5. A flag-locking mechanism as claimed in claim 4 in which the lower stationary pin has its opposite ends projecting outside of the outside faces of the side walls of said housing, a pair of cables affixed to the opposite ends of said locking pin for exerting a downward pull thereon when the lower end of said cable is pulled upon, and guide means in the opposite ends of the lower stationary pin through which said pair of cables move, respectively.

* * * * *